United States Patent
Minter et al.

(10) Patent No.: US 12,480,343 B2
(45) Date of Patent: Nov. 25, 2025

(54) CASEMENT WINDOW LOCK BAR

(71) Applicant: ASSA ABLOY FENESTRATION, LLC, Rochester, NY (US)

(72) Inventors: Peter Minter, Reno, NV (US); Mark Jones, Reno, NV (US)

(73) Assignee: ASSA ABLOY FENESTRATION, LLC, Rochester, NY (US)

(*) Notice: Subject to any disclaimer, the term of this patent is extended or adjusted under 35 U.S.C. 154(b) by 0 days.

(21) Appl. No.: 18/632,813

(22) Filed: Apr. 11, 2024

(65) Prior Publication Data
US 2024/0254816 A1    Aug. 1, 2024

Related U.S. Application Data

(63) Continuation of application No. 17/332,472, filed on May 27, 2021, now Pat. No. 11,993,965, which is a
(Continued)

(51) Int. Cl.
*E05C 9/02* (2006.01)
*E05C 9/18* (2006.01)
(Continued)

(52) U.S. Cl.
CPC ........... *E05C 9/028* (2013.01); *E05C 9/1808* (2013.01); *E05C 9/22* (2013.01); *E05C 2007/007* (2013.01); *E05Y 2900/148* (2013.01)

(58) Field of Classification Search
CPC .......... E05C 9/028; E05C 9/1808; E05C 9/22; E05C 2007/007; E05Y 2900/148
See application file for complete search history.

(56) References Cited

U.S. PATENT DOCUMENTS

| 4,991,886 A | 2/1991 | Nolte et al. |
| 5,730,477 A | 3/1998 | Nagy |

(Continued)

FOREIGN PATENT DOCUMENTS

| CA | 2706692 A1 | 9/2003 |
| CA | 2545852 A1 | 11/2006 |

(Continued)

*Primary Examiner* — Mark A Williams
(74) *Attorney, Agent, or Firm* — DeLio Peterson & Curcio LLC; David R. Pegnataro

(57) ABSTRACT

A locking assembly for a casement window including a frame having an elongated surface, comprising a tie bar guide adapted to be mounted on the window frame surface, the tie bar guide having first and second receiving grooves for slideably receiving segments of a tie bar in a tongue and groove manner, and a tie bar adapted to slide axially in a direction parallel to the window frame surface and having a partially curved profile and a cross-section comprising a flat central portion with a first segment comprising a first tongue and a second segment comprising a second tongue, the first and second segments on opposite sides relative to the central portion. The tie bar is slideably received in the tie bar guide such that the tie bar first tongue is received in the tie bar guide first receiving groove and the tie bar second tongue is received in the tie bar guide second receiving groove, to permit the position of the tie bar to be adjusted with respect to the tie bar guide in the longitudinal direction while preventing movement of the tie bar in a direction perpendicular to the longitudinal direction. One of the tie bar and tie bar guide has an opening in an exterior surface thereof and the other has a projection extending in a direction of the opening, wherein when the tie bar is slideably received within the tie bar guide, the projection and opening act as a detent to maintain the tie bar guide in a desired position.

8 Claims, 10 Drawing Sheets

Related U.S. Application Data continuation of application No. 15/686,819, filed on Aug. 25, 2017, now Pat. No. 11,053,716.

(51) Int. Cl.
*E05C 9/22* (2006.01)
*E05C 7/00* (2006.01)

(56) References Cited

U.S. PATENT DOCUMENTS

| | | | |
|---|---|---|---|
| 6,651,389 | B2 | 11/2003 | Minter |
| 6,698,970 | B2 | 3/2004 | Guillemet et al. |
| 6,837,004 | B2 | 1/2005 | Annes |
| 7,100,327 | B2 | 9/2006 | Rangabasyam et al. |
| 7,452,014 | B2 | 11/2008 | Vetter |
| 7,752,809 | B2 | 7/2010 | DiVinadio |
| 8,099,907 | B2 | 1/2012 | DiVinadio |
| 8,205,392 | B2 | 6/2012 | DiVinadio |
| 8,353,541 | B2 * | 1/2013 | Minter .................. E05C 9/1808 292/137 |
| 8,448,996 | B2 * | 5/2013 | Lake .................. E05C 9/02 292/DIG. 7 |
| 9,109,384 | B2 * | 8/2015 | Minter .................. E05C 19/10 |
| 9,151,094 | B2 | 10/2015 | Lambertini |
| 9,217,266 | B2 | 12/2015 | Bauman |
| 9,512,658 | B2 * | 12/2016 | Balbo Di Vinadio .. E05F 11/28 |
| 10,012,016 | B2 * | 7/2018 | Li ........................... E05D 15/52 |
| 2005/0016073 | A1 | 1/2005 | Petta et al. |
| 2006/0048450 | A1 | 3/2006 | Curtis et al. |
| 2007/0011948 | A1 | 1/2007 | Rangabasyam et al. |
| 2007/0096476 | A1 | 5/2007 | Vetter |
| 2008/0016782 | A1 | 1/2008 | DiVinadio |
| 2008/0250719 | A1 | 10/2008 | Griffin et al. |
| 2011/0204657 | A1 * | 8/2011 | Lambertini ............. E05C 9/185 292/33 |
| 2012/0146342 | A1 * | 6/2012 | Bauman ................ E05B 15/008 292/138 |
| 2014/0196376 | A1 * | 7/2014 | Nguyen ................ E05C 9/1808 292/341.15 |
| 2016/0060919 | A1 | 3/2016 | Vetter |
| 2016/0060938 | A1 * | 3/2016 | Pacini ...................... E06B 3/36 49/281 |
| 2016/0076284 | A1 | 3/2016 | Bauman |
| 2016/0130847 | A1 * | 5/2016 | Gramstad ............. E05C 9/1833 49/394 |
| 2017/0362857 | A1 * | 12/2017 | Zaccaria ................. E05B 65/06 |
| 2018/0010371 | A1 * | 1/2018 | Zaccaria ................... E05C 9/24 |
| 2021/0102417 | A1 * | 4/2021 | Doring ..................... E05C 9/22 |

FOREIGN PATENT DOCUMENTS

| | | |
|---|---|---|
| CA | 2430213 C | 12/2006 |
| CA | 2590741 A1 | 12/2007 |
| CA | 2591018 A1 | 12/2007 |
| CA | 2591353 A1 | 12/2007 |

* cited by examiner

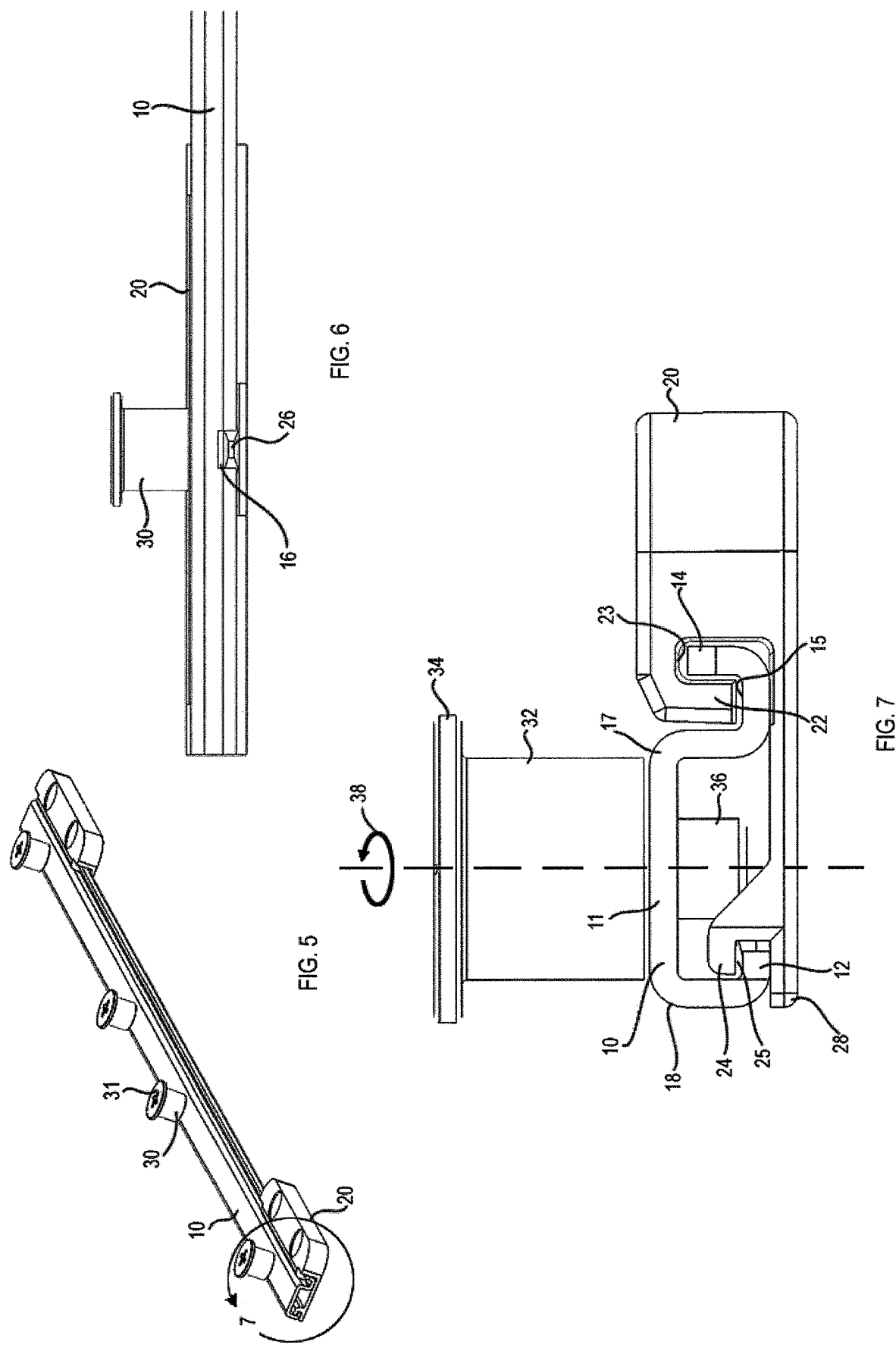

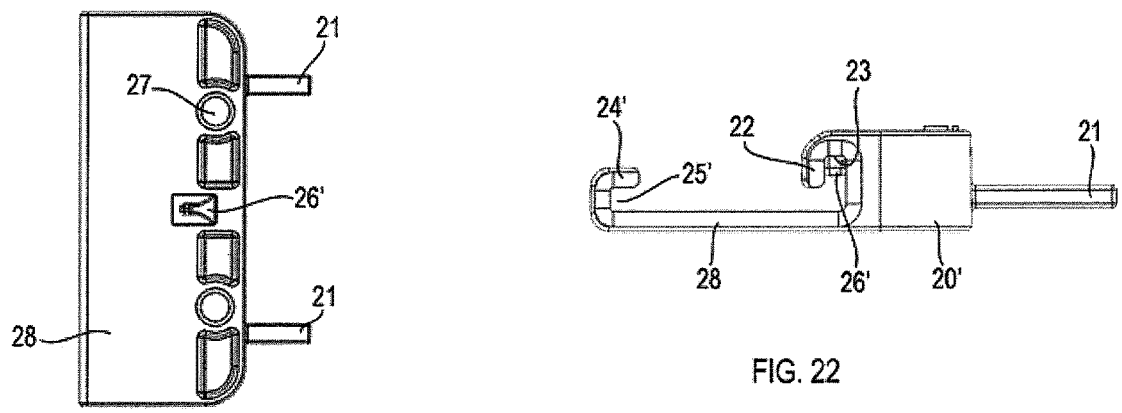
FIG. 22
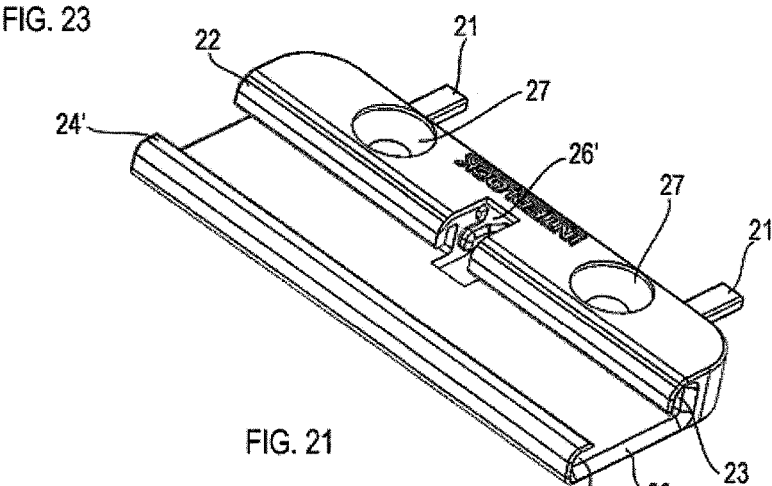
FIG. 21
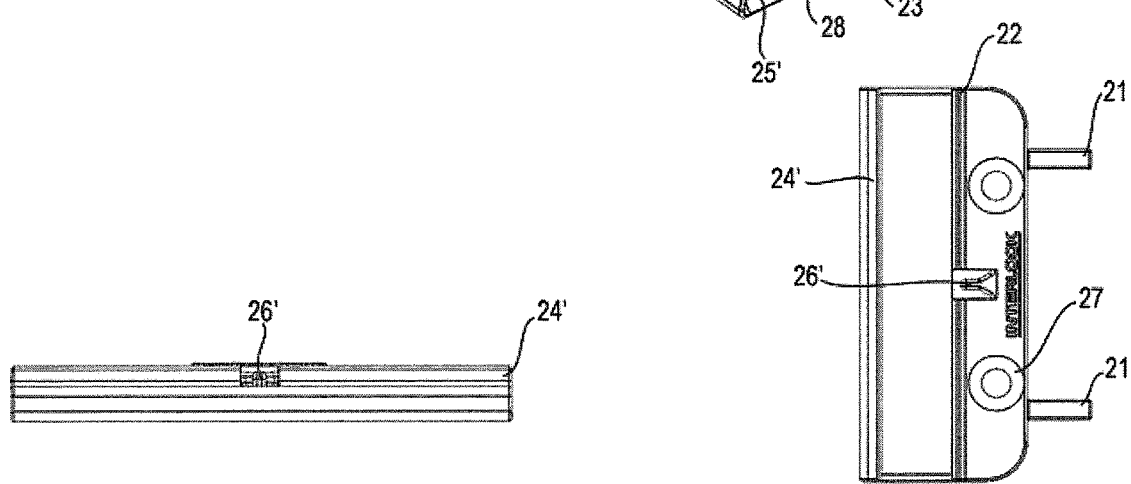
FIG. 24
FIG. 25

CASEMENT WINDOW LOCK BAR

BACKGROUND OF THE INVENTION

1. Field of the Invention

The present invention relates generally to locking mechanisms for casement windows. More specifically, the present invention relates to tie bars for multi-point or sequential locking mechanisms for casement windows, and an improved tie bar guide used to secure a tie bar to a frame of a casement window and which facilitates the placement of the tie bar and tie bar guides along the frame of the window.

2. Description of Related Art

Casement windows are typically hinged along one side and swing closed into a fixed frame. One type of locking mechanism for casement windows uses a flat tie bar slideably mounted to the window frame along the open side of the window. The tie bar is provided with multiple locking pins that extend outward from the tie bar. A locking handle is provided on the interior of the window frame that can be thrown by the user between locked and unlocked positions. The locking handle slides the tie bar, which moves each locking pin between a corresponding locked and unlocked position.

The casement window sash may be provided with multiple hook-shaped ramped keepers that move into position in front of the locking pins on the frame as the window is closed. The user then moves the locking handle to the locked position, which slides the tie bar and drives each individual locking pin into engagement with the corresponding keeper.

The locking pins and keepers are appropriately spaced so that the locking pins engage the keepers in a sequential manner, typically starting with the bottom of the sash and ending at the top of the sash. As a result, the bottom of the sash is locked first and the interaction of the middle and top locking pins with the middle and top ramped keepers results in the middle and top portions of the sash being pulled against the frame and locked shut.

Another type of casement window lock assembly replaces the more conventional locking pin with a "roller" pin having an outer cylindrical roller that rotates on an inner pin which serves as an axle for the outer roller. The outer roller provides a low friction rolling contact between the inner hook portion of the keeper and the outer surface of the locking pin. In a conventional "roller" pin design, the inner pin is adjustably attached at one end to the tie bar and is provided with an end plate at the opposite end that is larger in diameter than the maximum diameter of the outer roller. The end plate is parallel to the tie bar. The outer roller, which is cylindrical, is loosely held between the end plate of the inner pin and the tie bar where it is free to rotate about the inner pin. The end plate has a diameter that is greater than the inner width of the opening in the hook portion of the keeper. The keeper engages the outer roller of the pin and is held between the tie bar and the end plate. This increases security by preventing the keeper from being pulled over the end of the roller pin. A roller pin of this type is disclosed in U.S. Pat. No. 6,651,389 entitled "Casement Window with Improved Tie Bar Guide and Striker" and issued to Minter, et al. on Nov. 25, 2003.

However, because the end plate in this type of roller pin design is part of the fixed inner pin, it does not rotate with the outer roller. As the tie bar slides and the roller pins move into their respective keepers, the fixed end plates slide directly against a surface of the keeper producing friction and wear. When multiple roller pins and keepers are simultaneously being engaged, this friction becomes objectionable.

One disadvantage of older tie bar and tie bar guide designs is that because a single style of locking hardware is often installed on a wide variety of window frames, the installer can often get confused as to the precise location of the tie bar and tie bar guide along the inside surface of the window frame. If the tie bar and tie bar guide are not installed properly, they each must be removed and re-installed. Therefore, there is a need for an improved tie bar and tie bar guide system which facilitates placement along the inside surface of the window frame to ensure proper installation at the right location and distance from the locking handle.

Another disadvantage of older tie bar and tie bar guide designs is the difficulty in correctly spacing the tie bar guides along the tie bar. As the tie bar slides through the tie bar guides, it is structurally important for the tie bar guides to be mounted to the inside surface of the window frame in an even, spaced-apart fashion. Further, because the tie bar guides slide over the tie bar, it is difficult for the installer to space the tie bar guides evenly apart as they are being secured to the window frame. Therefore, there is a need for an improved tie bar and tie bar guide system which makes it easier to evenly space the tie bar guides along the tie bar and window frame.

Still another disadvantage of older tie bar and tie bar guide designs is that they are preconfigured for left- or right-handed casement windows, e.g., the design must be flipped to accommodate the opposite handed window. Therefore, if the lock bar is sold assembled with the tie bar guides, manufacturers must produce two different assemblies, one for each of left- and right-handed casement windows. Therefore, there is a need for an improved tie bar and tie bar guide system with a symmetrical design which allows for installation in either left- or right-handed casement windows.

SUMMARY OF THE INVENTION

Bearing in mind the problems and deficiencies of the prior art, it is therefore an object of the present invention to provide an improved casement window tie bar and tie bar guide system which facilitates placement along the inside surface of the window frame.

It is another object of the present invention to provide an improved casement window tie bar and tie bar guide system which requires only one guide per lock point.

A further object of the present invention is to provide an improved tie bar guide which does not wrap around the tie bar profile, allowing for simplified tie bar guide placement.

Still another object of the present invention is to provide an improved tie bar and tie bar guide system which is symmetrical about the length of the tie bar to allow for installation in either a left- or right-handed casement window.

Still yet another object of the present invention is to provide an improved tie bar and tie bar guide system which does not require locking pins having a "roller" component.

Still other objects and advantages of the invention will in part be obvious and will in part be apparent from the specification.

The above and other objects, which will be apparent to those skilled in the art, are achieved in the present invention which is directed to a locking assembly for a casement window including a frame having an elongated surface. The locking assembly comprises a tie bar guide adapted to be mounted on the window frame surface, the tie bar guide having first and second receiving grooves for slideably receiving segments of a tie bar in a tongue and groove manner, and a tie bar adapted to slide axially in a direction parallel to the window frame surface and having a partially curved profile and a cross-section comprising a flat central portion with a first segment comprising a first tongue and a second segment comprising a second tongue, the first and second segments on opposite sides relative to the central portion. The tie bar is slideably received within the tie bar guide such that the tie bar first tongue is received in the tie bar guide first receiving groove and the tie bar second tongue is received in the tie bar guide second receiving groove to permit the position of the tie bar to be adjusted with respect to the tie bar guide in the longitudinal direction while preventing movement of the tie bar in a direction perpendicular to the longitudinal direction. The tie bar guide wraps around only a portion of the profile of the tie bar, and the tie bar and tie bar guide are each symmetrical about their lengths.

The tie bar guide may further comprise a base portion adapted to be mounted on the window frame surface and a lip extending above and parallel to the tie bar guide base portion, one of the tie bar guide first or second receiving grooves defined between the lip and the tie bar guide base portion. The tie bar guide may further comprise at least one tab extending from a rear surface thereof which is adapted to space the tie bar guide away from an inner corner of the window frame.

The tie bar may further comprise at least one opening in an exterior surface thereof for locating a locking pin having an eccentrically mounted projection extending transversely through the tie bar, the locking pin adapted to be tightened to a desired degree, normal to the tie bar longitudinal direction, against an external face of a striker mounted on a window sash opposite the tie bar when the locking assembly is in a locked position, and the tie bar guide may further comprise a projection for locating the at least one opening as the tie bar is slid axially through tie bar guide to aid in positioning of the tie bar guide during assembly of the casement window, the projection and opening acting as a detent to maintain the tie bar guide in a desired position. The tie bar guide projection deforms against an outer surface of the tie bar as the tie bar is slid axially through the tie bar guide and returns to its original shape to mate with the at least one opening when the tie bar guide reaches proper alignment.

The locking assembly may further comprise a locking handle mounted to an interior surface of the window frame and rotatable along an axis perpendicular to the tie bar, the locking handle adapted to engage a locking pin extending transversely through the tie bar and slide the tie bar axially along the window frame, a striker mounted to a window sash, and at least one locking pin having an eccentrically mounted projection extending transversely through the tie bar, the at least one locking pin adapted to be tightened to a desired degree, normal to the tie bar longitudinal direction, against an external face of the striker when the locking handle is rotated to move the at least one locking pin to a locked position.

In another aspect, the present invention is directed to a method of operating a casement window, comprising providing a tie bar guide mounted on a window frame surface, the tie bar guide having first and second receiving grooves for slideably receiving segments of a tie bar in a tongue and groove manner, providing a tie bar having a partially curved profile and a cross-section comprising a flat central portion with a first segment comprising a first tongue, and a second segment comprising a second tongue, the first and second segments on opposite sides relative to the central portion; and axially sliding the tie bar within the tie bar guide such that the tie bar first tongue is received in the tie bar guide first receiving groove and the tie bar second tongue is received in the tie bar guide second receiving groove to permit the position of the tie bar to be adjusted with respect to the tie bar guide in a longitudinal direction while preventing movement of the tie bar in a direction perpendicular to the longitudinal direction. The tie bar wraps around only a portion of the profile of the tie bar as the tie bar slides axially within the tie bar guide.

The tie bar guide may further comprise a base portion mounted on the window frame surface and a lip extending above and parallel to the tie bar guide base portion, one of the tie bar guide first or second receiving grooves defined between the lip and the tie bar guide base portion.

The tie bar may comprise at least one opening in an exterior surface thereof for locating a locking pin having an eccentrically mounted projection extending transversely through the tie bar, and the tie bar guide may comprise a projection for locating the at least one opening, the projection and opening acting as a detent to maintain the tie bar guide in a desired position, and the method may further comprise aligning the tie bar guide projection with the tie bar opening as the tie bar is slid axially through the tie bar guide to aid in positioning of the tie bar guide.

The tie bar guide detent deforms against an outer surface of the tie bar as the tie bar is slid axially through the tie bar guide and returns to its original shape to mate with the at least one opening when the tie bar guide reaches proper alignment.

The method may further comprise providing a locking handle mounted to an interior surface of the window frame and rotatable along an axis perpendicular to the tie bar, the locking handle adapted to engage a locking pin extending transversely through the tie bar and slide the tie bar axially along the window frame, and providing a striker mounted to a window sash and at least one locking pin having an eccentrically mounted projection extending transversely through the tie bar, the at least one locking pin adapted to be tightened to a desired degree, normal to the tie bar longitudinal direction, against an external face of the striker when the locking handle is rotated to move the at least one locking pin to a locked position, and rotating the locking handle to move the at least one locking pin between locked and unlocked positions.

In yet another aspect, the present invention is directed to a locking assembly for a casement window including a frame having an elongated surface, comprising a tie bar guide adapted to be mounted on the window frame surface and a tie bar slideably received within the tie bar guide and adapted to slide axially in a direction parallel to the window frame surface, one of the tie bar and tie bar guide having an opening in an exterior surface thereof and the other having a projection extending in a direction of the opening, wherein when the tie bar is slideably received within the tie bar guide, the projection and opening act as a detent to maintain the tie bar guide in a desired position during installation of the locking assembly. The tie bar guide wraps around only a portion of the profile of the tie bar, and the tie bar and tie bar guide are each symmetrical about their lengths. The tie bar guide may further comprise at least one tab extending from a rear surface thereof which is adapted to space the tie bar guide away from an inner corner of the window frame.

The tie bar may comprise at least one opening in an exterior surface thereof for locating a locking pin having an eccentrically mounted projection extending transversely through the tie bar, the locking pin adapted to be tightened to a desired degree, normal to the tie bar longitudinal direction, against an external face of a striker mounted on a window sash opposite the tie bar when the locking assembly is in a locked position, and the tie bar guide may comprise a projection for locating the at least one opening as the tie bar is slid axially through tie bar guide to aid in positioning of the tie bar guide during assembly of the casement window. The tie bar guide projection deforms against an outer surface of the tie bar as the tie bar is slid axially through tie bar guide and returns to its original shape to mate with the at least one opening when the tie bar guide reaches proper alignment.

The locking assembly may further comprise a locking handle mounted to an interior surface of the window frame and rotatable along an axis perpendicular to the tie bar, the locking handle adapted to engage a locking pin extending transversely through the tie bar and slide the tie bar axially along the window frame, a striker mounted to a window sash, and at least one locking pin having an eccentrically mounted projection extending transversely through the tie bar, the at least one locking pin adapted to be tightened to a desired degree, normal to the tie bar longitudinal direction, against an external face of the striker when the locking handle is rotated to move the at least one locking pin to a locked position.

The tie bar guide may have first and second receiving grooves for slideably receiving segments of the tie bar in a tongue and groove manner, and the tie bar may have a partially curved profile and a cross-section comprising a flat central portion with a first segment comprising a first tongue, and a second segment comprising a second tongue, the first and second segments on opposite sides relative to the central portion, wherein the tie bar is slideably received in the tie bar guide such that the tie bar first tongue is received in the tie bar guide first receiving groove and the tie bar second tongue is received in the tie bar guide second receiving groove, to permit the position of the tie bar to be adjusted with respect to the tie bar guide in a longitudinal direction while preventing movement of the tie bar in a direction perpendicular to the longitudinal direction.

The tie bar guide may further comprise a base portion mounted on the window frame surface and a lip extending above and parallel to the tie bar guide base portion, one of the tie bar guide first or second receiving grooves defined between the lip and the tie bar guide base portion.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5 is a perspective view of one embodiment of an assembled tie bar and tie bar guide of the present invention, shown in a locked position.

FIG. 6 is a front, plan view of a portion of the embodiment of the assembled tie bar and tie bar guide of FIG. 5, showing the center projection of the tie bar guide properly aligned with an opening in the associated tie bar during assembly.

FIG. 7 is an end view of the assembled tie bar and tie bar guide of FIG. 5.

FIG. 21 is a perspective view of an embodiment of the tie bar guide of the present invention, as shown in FIG. 16.

FIG. 22 is a side, plan view of the embodiment of the tie bar guide shown in FIG. 21.

FIG. 23 is a bottom, plan view of the embodiment of the tie bar guide shown in FIG. 21.

FIG. 24 is a front, plan view of the embodiment of the tie bar guide shown in FIG. 21.

FIG. 25 is a top, plan view of the embodiment of the tie bar guide shown in FIG. 21.

DESCRIPTION OF THE EMBODIMENT(S)

Figure 1:
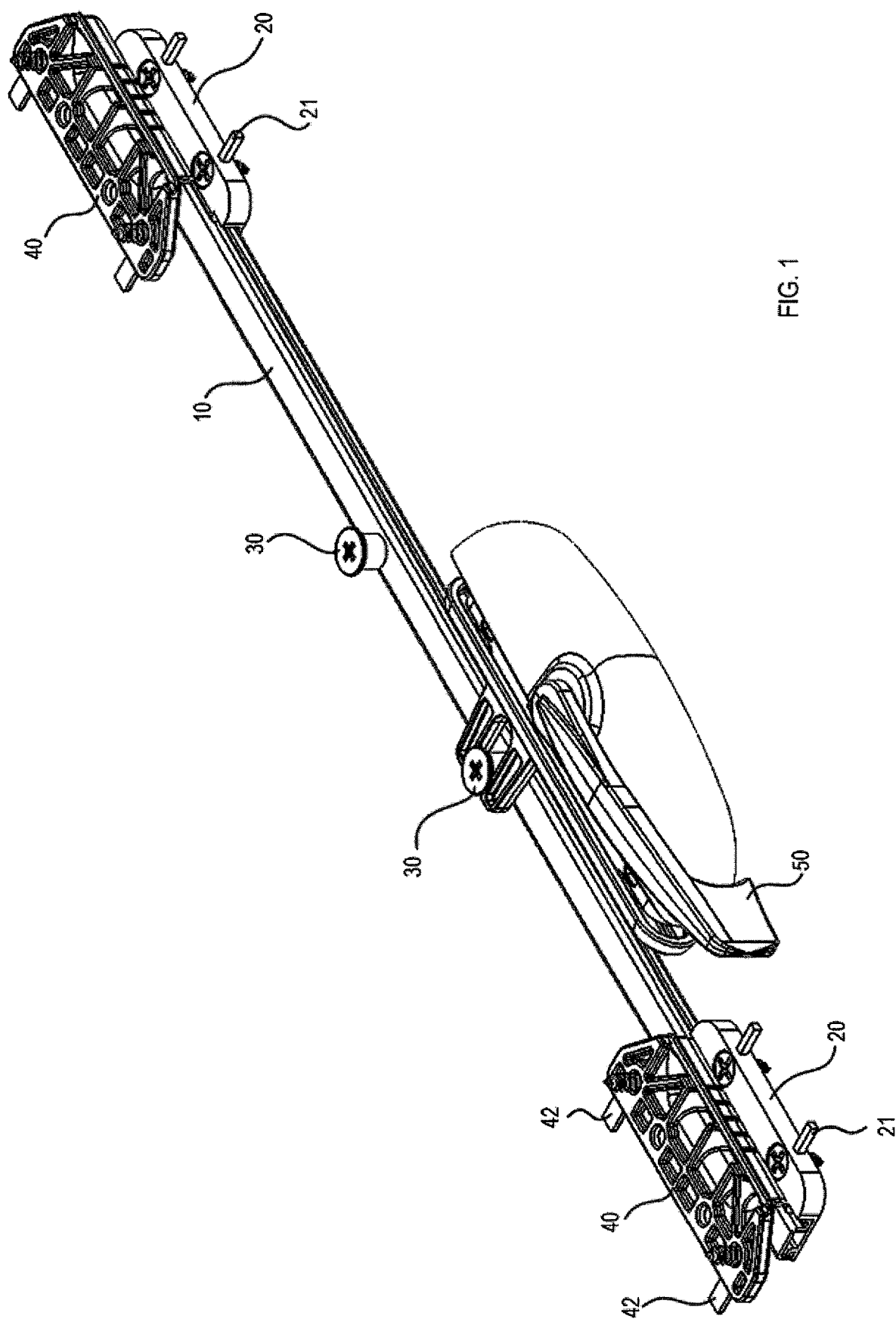
FIG. 1 is a perspective view of an embodiment of the tie bar and tie bar guide of the present invention with a locking handle engaging a center pin to move the tie bar in a longitudinal direction, with the end pins engaging and locking into a pair of strikers mounted on a window sash (not shown).

In describing the embodiments of the present invention, reference will be made herein to FIGS. 1-25 of the drawings, in which like numerals refer to like features of the invention.

Certain terminology is used herein for convenience only and is not to be taken as a limitation of the invention. For example, words such as "upper," "lower," "left," "right," "horizontal," "vertical," "upward," and "downward" merely describe the configuration shown in the drawings. For purposes of clarity, the same reference numbers will be used in the drawings to identify similar elements.

An exemplary casement window including an embodiment of the tie bar and tie bar guide locking assembly of the present invention is shown in FIGS. 1-15, inclusive. The casement window includes a locking mechanism comprising a tie bar slideably mounted to a window frame along the open side of the window. The tie bar is provided with multiple locking pins that extend outward from the tie bar. A locking handle is provided on the interior of the window frame that can be thrown by the user between locked and unlocked positions. The locking handle slides the tie bar, which moves each locking pin between a corresponding locked and unlocked position.

The casement window sash may be provided with multiple keepers or strikers that move into position in front of the locking pins on the frame as the window is closed. The user then moves the locking handle to the locked position, which slides the tie bar and drives each individual locking pin into engagement with the corresponding keeper or striker.

The locking pins and keepers are appropriately spaced so that the locking pins engage the keepers in a sequential manner, typically starting with the bottom of the sash and ending at the top of the sash. As a result, the bottom of the sash is locked first and the interaction of the middle and top locking pins with the middle and top ramped keepers results in the middle and top portions of the sash being pulled against the frame and locked shut.

Figure 2:
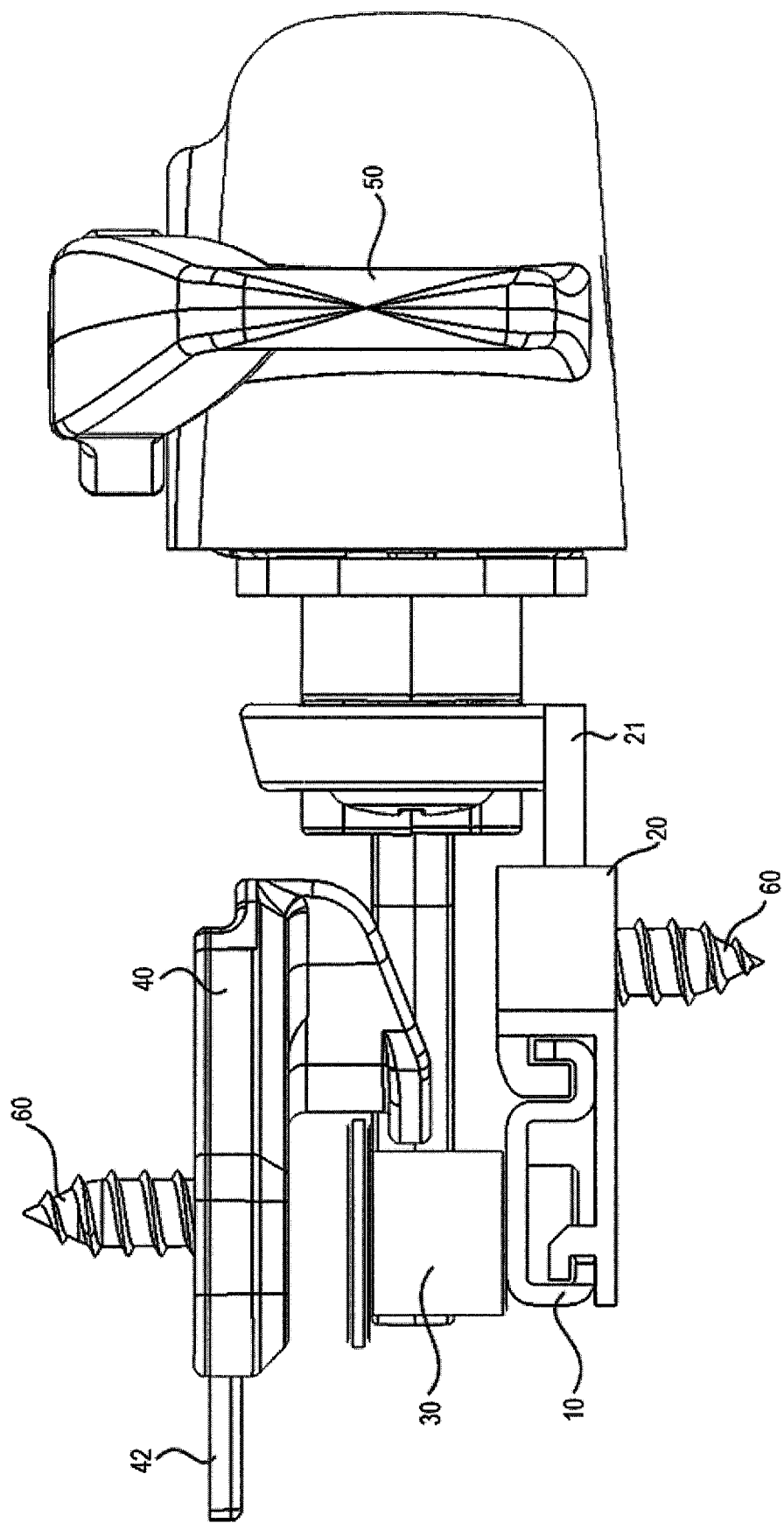
FIG. 2 is an isometric view of an embodiment of the tie bar and tie bar guide locking assembly of the present invention with a locking handle, with the tie bar guide secured to a window frame (not shown) and the striker mounted on a window sash (not shown).
Figure 4:
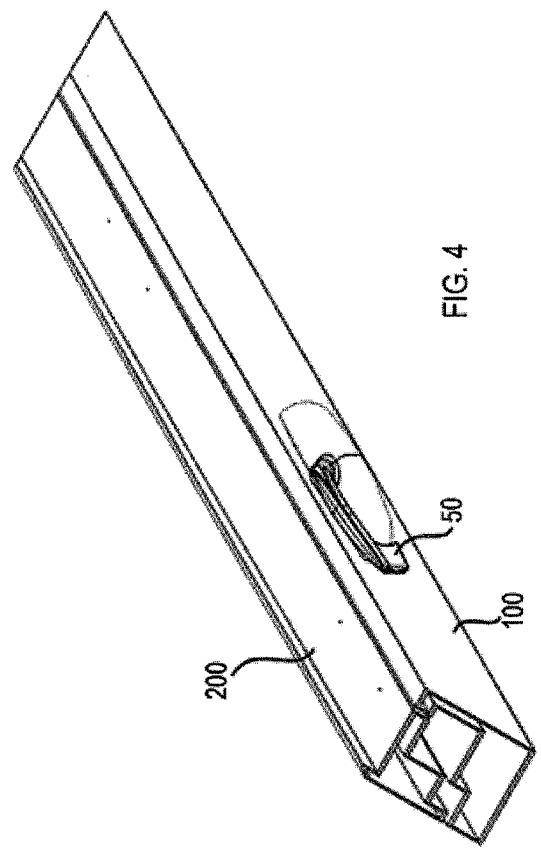
FIG. 4 is a perspective view of FIG. 3, showing the window sash in a closed position.
Figure 3:
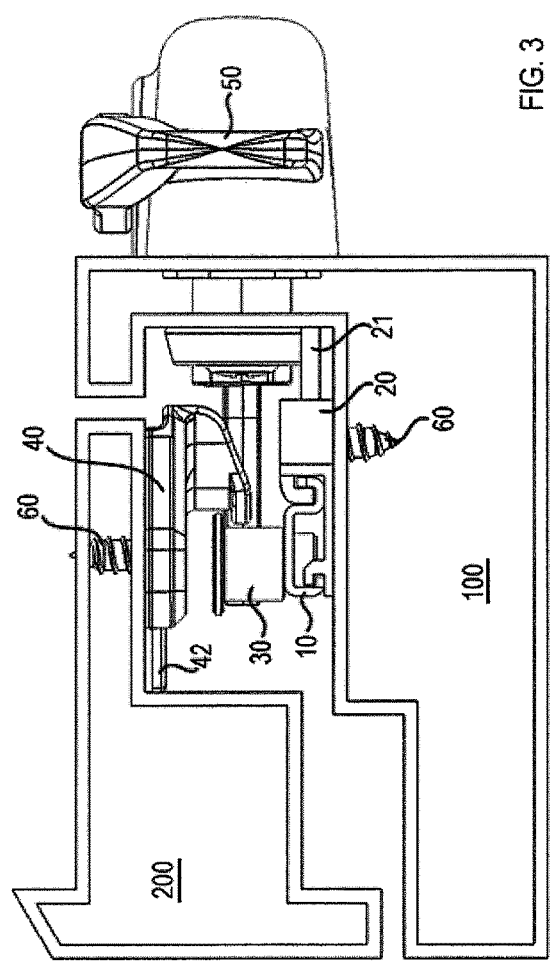
FIG. 3 shows the isometric view of FIG. 2, including a window frame and window sash, respectively.
Figure 15:
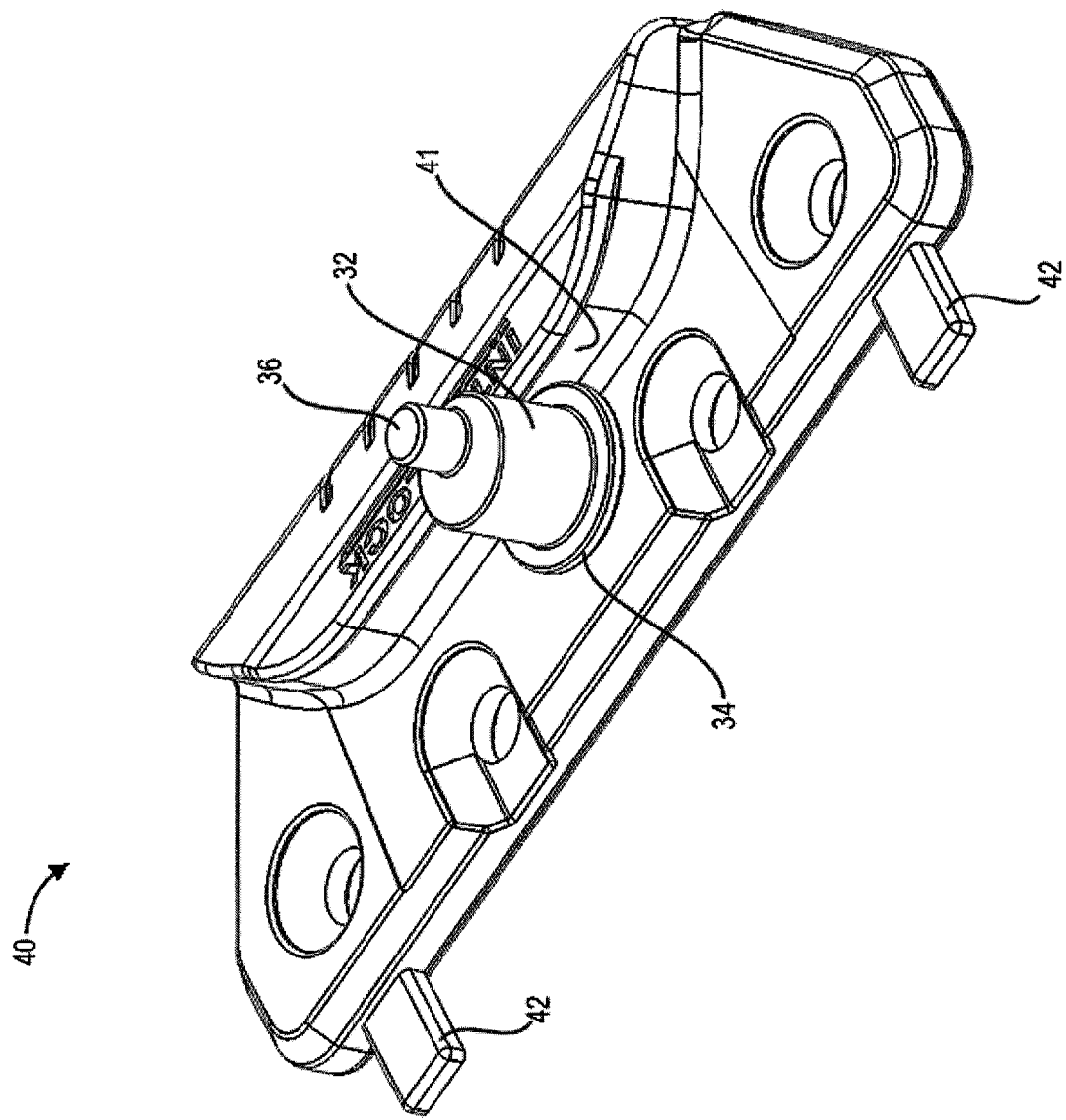
FIG. 15 is a perspective view of a locking pin of the tie bar locking assembly of the present invention engaging the external face of a striker to lock a window frame against a window sash (not shown).

FIGS. 1-4 depict an embodiment of the tie bar and tie bar guide of the present invention mounted on a window frame, with strikers mounted on a window sash, respectively. FIG. 1 shows a perspective view of an embodiment of the tie bar and tie bar guide locking assembly of the present invention in the locked position, with a locking handle 50 engaging a center pin 30 to move the tie bar in a longitudinal direction parallel to the window frame, indicated by the arrows, with the end pins engaging and locking into a pair of strikers 40 mounted on the window sash (FIG. 3). When the locking handle 50 is rotated to move the casement window into a locked position, locking pins 30 engage and are held against the external face 41 of a striker 40. A perspective view of an exemplary striker 40 of the present invention is shown in FIG. 15.

Unlike some tie bar and tie bar guide assemblies of the prior art, such as U.S. Pat. No. 6,651,389 to Minter et al., as described above, the present invention does not require that the locking pin be received in a slot or channel of a flat "keeper" or striker when the casement window is in the locked position, rather the flange 34 of the locking pin is held against an external face 41 of the striker 40 on one side only (FIG. 15). In fact, striker 40 does not have a slot or channel within which to receive a locking pin. Further, an advantage of the present invention is that only one tie bar guide is required per lock point, whereas in prior art assemblies, such as U.S. Pat. No. 6,651,389 to Minter et al., a minimum of two tie bar guides are required.

FIGS. 2-3 show an isometric view of an embodiment of the tie bar and tie bar guide of the present invention with a locking handle 50, with the tie bar guide 20 secured to a window frame 100 by way of a plurality of fasteners or screws 60, and the striker 40 secured on a window sash 200 opposite the tie bar and guide in the same manner. Tabs 42, as also shown in FIG. 15, space the striker 40 away from an inside corner of the window sash 200. Unlike prior art assemblies, striker 40 is screwed to the window sash 200 without the screws extending through any slot in the sash, and the keeper or striker tabs 42 do not extend into a slot in the sash.

FIGS. 5-7 show the tie bar and tie bar guide in an assembled, locked position, without the corresponding strikers, locking handle, and window frame and sash.

As shown, lock or tie bar 10 is adapted to be slideably received within tie bar guide 20, which is mounted on a window frame (not shown) extending parallel to the tie bar. Lock bar 10 has a length along which a plurality of locking pins 30 are mounted in spaced relationship, shown in FIG. 5 as four (4) locking pins. It should be understood by those skilled in the art that the number of locking pins is shown as four for exemplary purposes only and that the present invention is not limited to embodiments comprising four locking pins. As shown in FIG. 7, the tie bar guide 20 may have first and second receiving grooves or channels 23, 25 for receiving segments of tie bar 10 in a tongue and groove manner. Tie bar 10 has a partially curved profile and a cross-section comprising a flat central portion with a first portion or segment comprising a first lip or tongue, and a second portion comprising a second lip or tongue, the first and second portions on opposite sides relative to the central portion.

Figure 9:
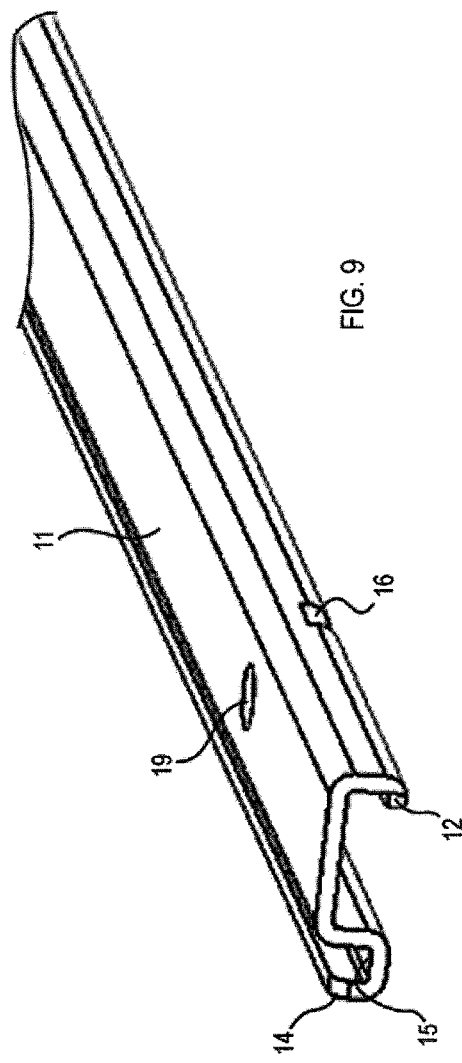
FIG. 9 is a magnified view of a portion of the tie bar of FIG. 8, showing a notch in an outer surface of the tie bar for aligning with a center projection in an associated tie bar guide during assembly.

As depicted in FIG. 7, and best shown in FIG. 9, in one embodiment, tie bar 10 has a cross-section comprising a flat central portion 11 with a first curved portion 17 on one edge comprising a vertical lip 14 defining a groove 15 between lip 14 and central portion 11, and a second curved portion 18 on the opposite edge comprising a horizontal lip 12 extending below and approximately parallel to the flat central portion 11 in the direction of the first curved portion. Each curved portion 17, 18 forms a lip or tongue to mate in a "tongue and groove" fashion with a complementary receiving groove portion of the tie bar guide (FIG. 7).

Figure 8:
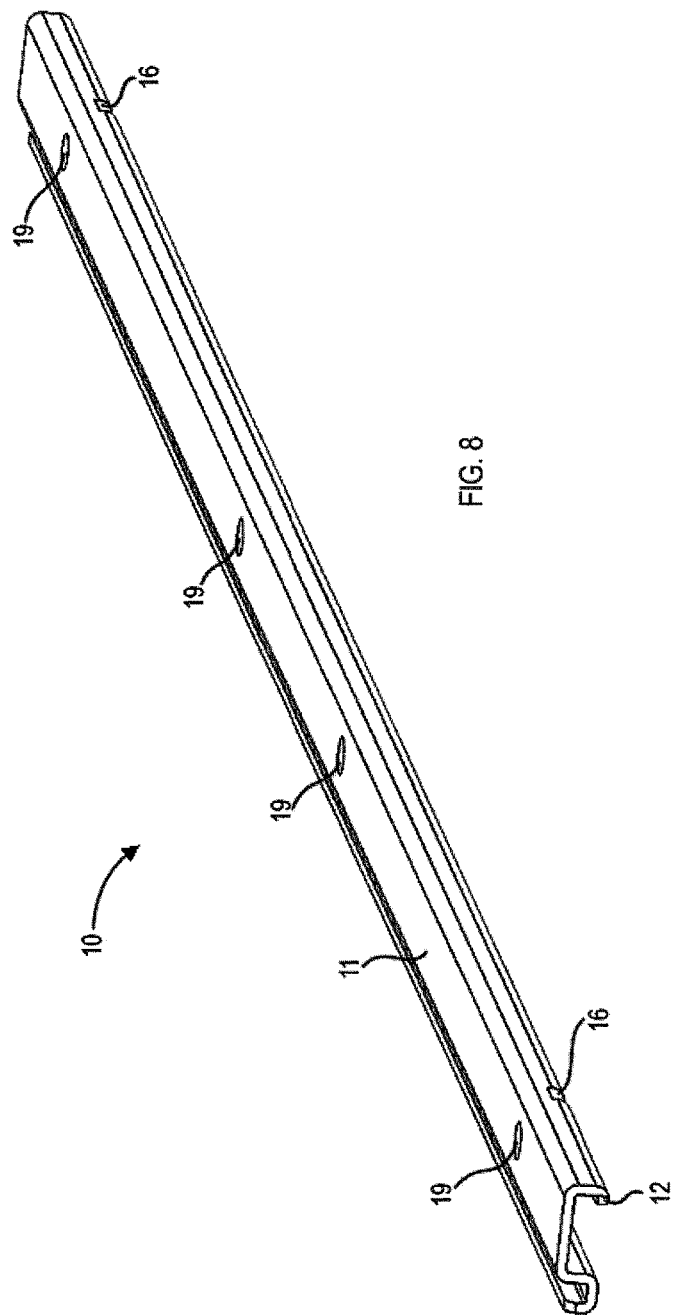
FIG. 8 is a perspective view of one embodiment of the tie bar of the present invention, as shown in FIG. 5.

As shown in FIG. 8, the flat central portion 11 of tie bar 10 comprises a plurality of through-holes 19 for receiving locking pins (not shown) inserted transversely therethrough. Tie bar 10 further includes at least one opening or notch 16 in an exterior surface thereof for mating with a locating tab or projection 26 extending from the tie bar guide 20 during assembly (FIG. 9). As shown in FIG. 8, each notch 16 is aligned with a through-hole 19 for receiving a locking pin 30.

Referring again to FIG. 7, locking pins 30 are of one piece, unitary construction and have an eccentrically mounted projection 36 extending transversely through the flat central portion 11 of tie bar 10. In at least one embodiment, and in contrast to locking pins of the prior art, locking pin 30 does not comprise a "roller" pin having an outer cylindrical roller that rotates on an inner pin which serves as an axle for the outer roller. Locking pin 30 has a top flange 34 adapted to be tightened to a desired degree, normal to the tie bar longitudinal direction, against an external face of a striker (FIGS. 2-3, and 15) when a locking handle is thrown by a user to move the locking assembly into the locked position. Pin 30 may be rotated in the direction of arrow 38 about projection 36 to move its position transversely with respect to the lock bar 10, but once positioned it remains fixed. Pin projection 36 extends only from the pin body 32, and does not pass or extend through the pin body, and does not pass through any "roller" section. In an embodiment, as shown in FIG. 5 (and also shown in FIGS. 16-17), each locking pin 30 may include a hex engagement 31 for tightening of the pin 30 to adjust seal compression. Once positioned properly, the pin 30 is fixed and does not rotate or roll.

In one embodiment of the present invention, as shown in FIG. 7, the tie bar first curved portion 17 may be U-shaped from which vertical lip 14 extends upwardly, and the second curved portion 18 may be a C-shaped portion from which horizontal lip 12 extends below the flat central portion 11 in the direction of the U-shaped portion, wherein each lip 14, 12 is adapted to mate in a "tongue and groove" fashion with a complementary receiving groove portion 23, 25 of the tie bar guide 20. As shown in FIG. 7, in contrast to tie bar guides of the prior art, tie bar guide 20 wraps around only a portion of the profile of the tie bar 10, shown in FIG. 7 as the portions of the guide profile comprising lips 12, 14. By wrapping around only a portion of the profile of the tie bar, rather than the entire profile as in the prior art, it allows for simplified tie bar guide spacing and placement along the surface of the window frame.

Figure 10:
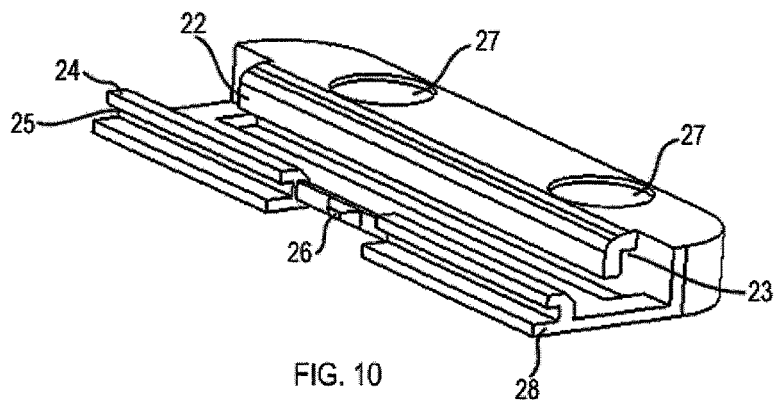
FIG. 10 is a perspective view of one embodiment of the tie bar guide of the present invention, as shown in FIG. 5.
Figure 13:
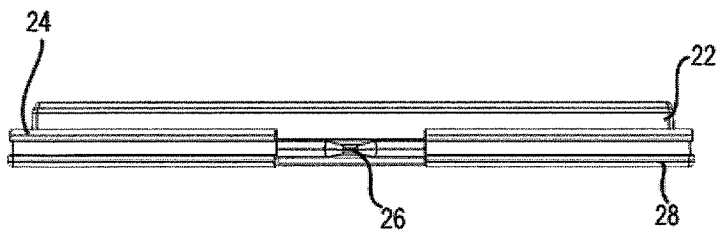
FIG. 13 is a front, plan view of the embodiment of the tie bar guide shown in FIG. 10.

As further shown in FIG. 7, and also shown in a perspective view of FIG. 10, tie bar guide 20 may have a cross-section comprising a first portion having an inverted U-shape from which a vertical lip 22 extends downwardly defining a first receiving groove 23, and on one edge has a curved portion from which a horizontal lip 24 extends above and parallel to a base portion of the tie bar guide to define a second receiving groove 25. As shown in FIG. 7, in an embodiment, the curved portion may be a backward C-shape, wherein horizontal lip 24 comprises the top portion of the backward "C" and the base portion 28 of the tie bar guide comprises the bottom portion of the backward "C" shape.

FIGS. 10-14 depict multiple views of an embodiment of the tie bar guide of the present invention, as shown in FIGS. 5-7. As shown in FIGS. 10-14, tie bar guide 20 may further comprise a locating tab or projection 26, which may be positioned at the approximate midpoint in the length of the tie bar guide 20, to aid in positioning the tie bar guide with the associated tie bar 10 as the tie bar is slid axially through the tie bar guide during assembly. When the tie bar guide is properly positioned, projection 26 extends into a notch or opening 16 in an exterior surface of the tie bar 10, as shown in FIG. 6, and the projection and opening act as a detent to maintain the tie bar guide in a desired position. As shown in FIGS. 10-14, projection 26 may have opposing angled surfaces oriented in the direction of axial movement of the tie bar 10, such that the projection is adapted to release from the opening or notch with sufficient force to permit the position of the tie bar to be adjusted with respect to the tie bar guide in the longitudinal direction as the locking assembly moves between locked and unlocked positions. In an embodiment, the tie bar vertical lip 14 may extend along at least a portion of the length of tie bar 10 and may comprise a plurality of spaced notches 16 each aligned with a through-hole or aperture 19 for receiving a locking pin 30 (FIG. 5). When properly positioned, each tie bar guide projection 26 mates with a corresponding opening 16 in the tie bar to indicate proper alignment of the tie bar guide 20.

It should be understood by those skilled in the art that in other embodiments of the present invention, the projection/opening configuration may be reversed, such that the tie bar may instead comprise a projection extending in the direction of an opening in the tie bar guide. In either such configuration, as the tie bar is slid axially through the tie bar guide during assembly, projection 26 will extend into notch or opening 16 to indicate the proper alignment, and the projection/opening configuration will act as a detent to maintain the tie bar guide in a desired position.

Figure 12:
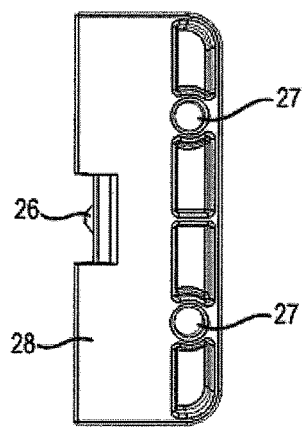
FIG. 12 is a bottom, plan view of the embodiment of the tie bar guide shown in FIG. 10.
Figure 11:
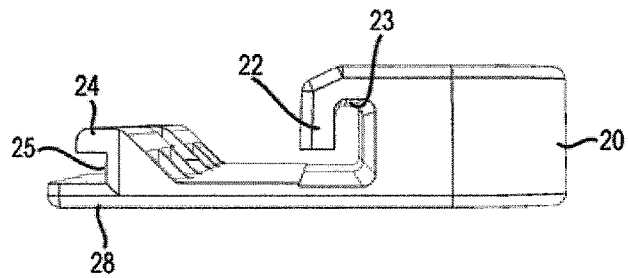
FIG. 11 is a side, plan view of the embodiment of the tie bar guide shown in FIG. 10.
Figure 14:
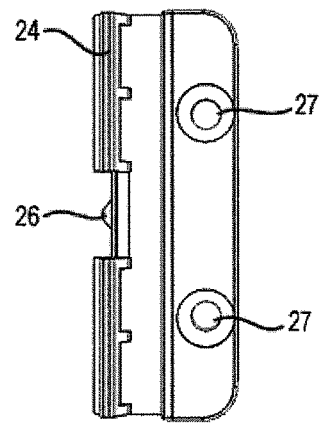
FIG. 14 is a top, plan view of the embodiment of the tie bar guide shown in FIG. 10.

In at least one embodiment, the tie bar guide projection 26 deforms against an outer surface of the tie bar 10 as the tie bar is slid axially through the tie bar guide and returns to its original shape to mate with the opening 16 when the tie bar guide 20 reaches proper alignment. Unlike tie bar guides of the prior art, such as U.S. Pat. No. 6,651,389 to Minter et al., entitled "Casement Window with Improved Tie Bar Guide and Striker", positioning tab or projection 26 does not break off nor is sheared off as the tie bar 10 is slid axially through tie bar guide 20 and into proper position (FIG. 6). Rather, projection 26 flexes against the outer surface of the tie bar as the tie bar is slid axially within the tie bar guide and is biased outwardly into the corresponding notch in the tie bar when the tie bar guide is in the proper position. The mating projection 26 and notch or opening 16 will act as a detent to maintain the tie bar guide in a desired position, and to prevent movement of the tie bar in a direction perpendicular to its longitudinal axis. Moreover, unlike tie bar guides of the prior art, the tie bar guide 20 of the present invention does not use locating flanges or legs received within a groove in the window frame. As shown in FIGS. 10, 12 and 14, tie bar guide 20 comprises at least one through-hole 27 for receiving a fastener to secure the tie bar guide to a window frame (not shown). As shown in FIGS. 2-3, tie bar guide 20 may include at least one tab 21 extending from a rear surface thereof to space the tie bar guide away from an inner corner of the window frame during installation. The tie bar guide is secured to a surface of the window frame using fasteners 60 extending through the guide, and no portion of the guide extends or is received within the frame (FIG. 3).

As best shown in FIG. 7, in an embodiment, tie bar 10 is slideably received in tie bar guide 20 such that tie bar vertical lip 14 is received in the tie bar guide receiving groove 23 and the tie bar horizontal lip 12 is received in the tie bar guide second receiving groove 25, to permit the position of the tie bar to be adjusted with respect to the tie bar guide in a longitudinal direction, while preventing movement of the tie bar in a direction perpendicular to the longitudinal direction. As shown in FIG. 7, the horizontal lips 12, 24 of the tie bar and tie bar guide mutually project into the cavities or grooves formed by their C- and L-shapes, respectively, and the vertical lips 14, 22 of the tie bar and tie bar guide mutually project into the cavities or grooves formed by their U-shapes. It should be understood by those skilled in the art that the present invention is not limited to the tie bar/tie bar guide C- and L-shaped "tongue and groove" orientation shown in FIG. 7, and that other orientations may also be used so long as the mating "tongue and groove" orientation allows for adjustment of the position of the tie bar with respect to the tie bar guide in a longitudinal direction along the window frame, while preventing movement of the tie bar in a direction perpendicular to the longitudinal direction.

Another advantage of the present invention is that the tie bar and tie bar guide assembly is symmetrical about the center length of the tie bar. In contrast to assemblies of the prior art, which require the tie bar guide to be flipped for left- and right-handed casement windows, the tie bar and tie bar guide assembly of the present invention may be installed in either a left- or right-handed casement window due to its symmetrical design. This provides an advantage for manufacturers, in that, if the tie or lock bar is sold assembled with the guides, only one assembly is required to be produced, whereas prior art designs require a separate assembly to be produced for each of left- and right-handed installations.

Figure 17:
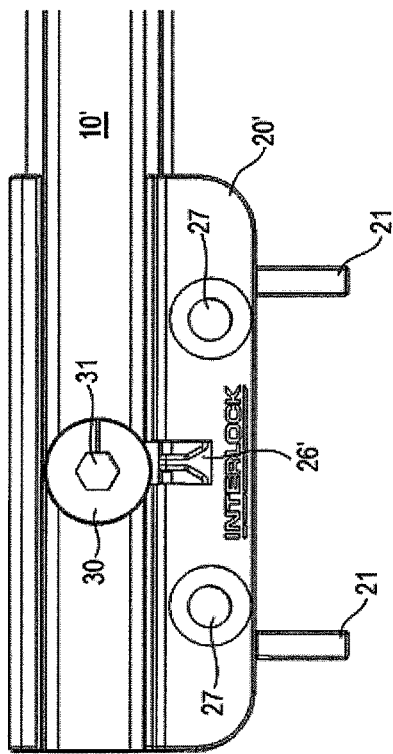
FIG. 17 is a top, plan view of a portion of the embodiment of the assembled tie bar and tie bar guide of FIG. 16, showing the center projection of the tie bar guide properly aligned with a notch in the associated tie bar during assembly.
Figure 16:
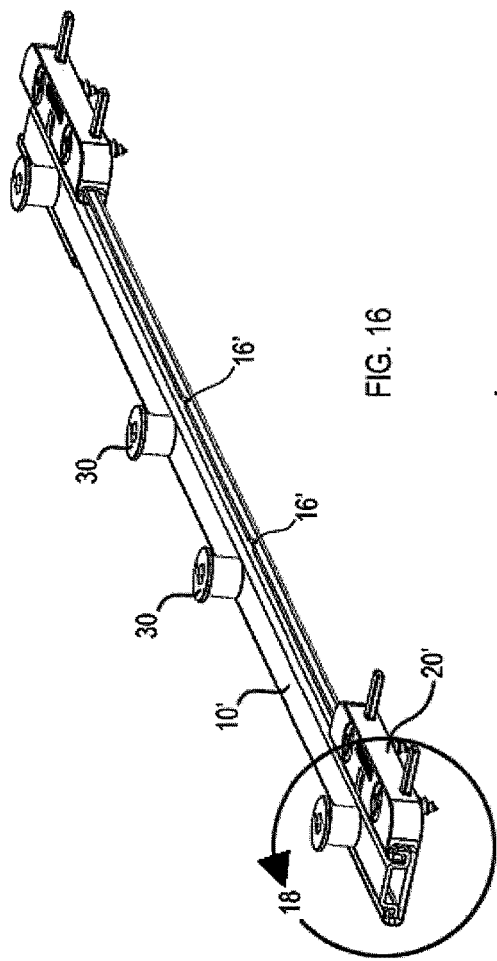
FIG. 16 is a perspective view of another embodiment of an assembled tie bar and tie bar guide locking assembly of the present invention, shown in a locked position.
Figure 18:
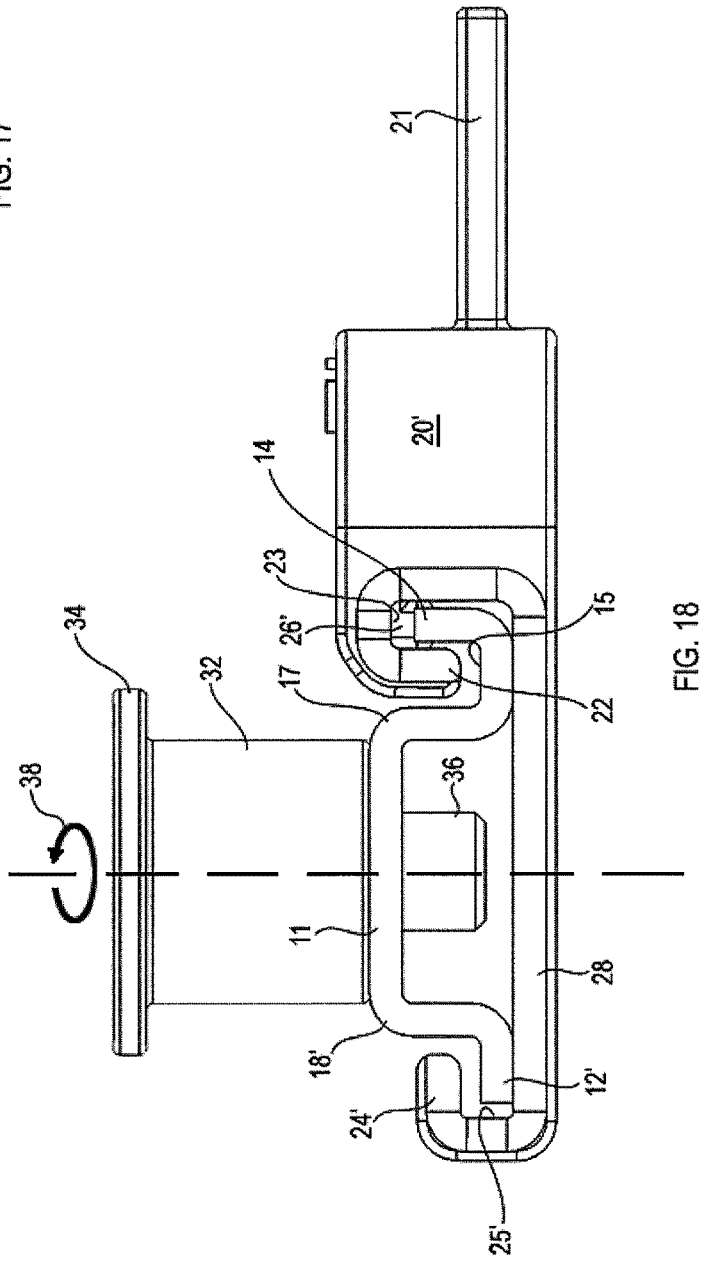
FIG. 18 is an end view of the assembled tie bar and tie bar guide of FIG. 16.

A second embodiment of the tie bar and tie bar guide of the present invention is shown in FIGS. 16-25, inclusive. As shown in FIG. 18, and best seen in FIG. 20, tie bar 10' has a cross-section comprising a flat central portion 11 with a first curved portion 17 on one edge comprising a vertical lip 14 defining a groove 15, and a second curved portion 18' on the opposite edge comprising a horizontal lip 12' extending below and approximately parallel to the flat central portion 11 in a direction opposite the first curved portion. Each curved portion 17, 18' forms a lip or tongue to mate in a "tongue and groove" fashion with a complementary receiving groove portion of a tie bar guide 20' (FIG. 18).

As further shown in FIG. 18, the tie bar first curved portion 17 may be U-shaped from which vertical lip 14 extends upwardly, and the second curved portion 18' may be a backward L-shaped portion from which horizontal lip 12' extends below the flat central portion 11 in a direction opposite the U-shaped portion, wherein each lip 12', 14 is adapted to mate in a "tongue and groove" fashion with a complementary receiving groove portion 23, 25' of the tie bar guide 20'.

As further shown in FIG. 18, and also shown in a perspective view of FIG. 21, tie bar guide 20' has a cross-section comprising a first portion having an inverted U-shape from which a vertical lip 22 extends downwardly defining a first receiving groove 23, and on one edge has a curved portion from which a horizontal lip 24' extends inwardly to define a second receiving groove 25'. As shown in FIG. 18, in an embodiment, the curved portion may be a C-shape, wherein horizontal lip 24' comprises the top portion of the "C" and the base portion 28 of the tie bar guide comprises the bottom portion of the "C" shape.

Tie bar 10' is slideably received in tie bar guide 20' such that tie bar vertical lip 14 is received in the tie bar guide receiving groove 23 and the tie bar horizontal lip 12' is received in the tie bar guide second receiving groove 25', to permit the position of the tie bar to be adjusted with respect to the tie bar guide in a longitudinal direction only, and to prevent movement of the tie bar 10' in a direction perpendicular to the longitudinal axis of the tie bar. As can be seen in FIG. 18, tie bar guide 20' wraps around only a portion of the profile of the tie bar 10'. As further shown in FIG. 18, the horizontal lips 12', 24' of the tie bar and tie bar guide mutually project into the cavities or grooves formed by their C- and L-shapes, respectively, and the vertical lips 14, 22 of the tie bar and tie bar guide mutually project into the cavities or grooves formed by their U-shapes.

Figure 19:
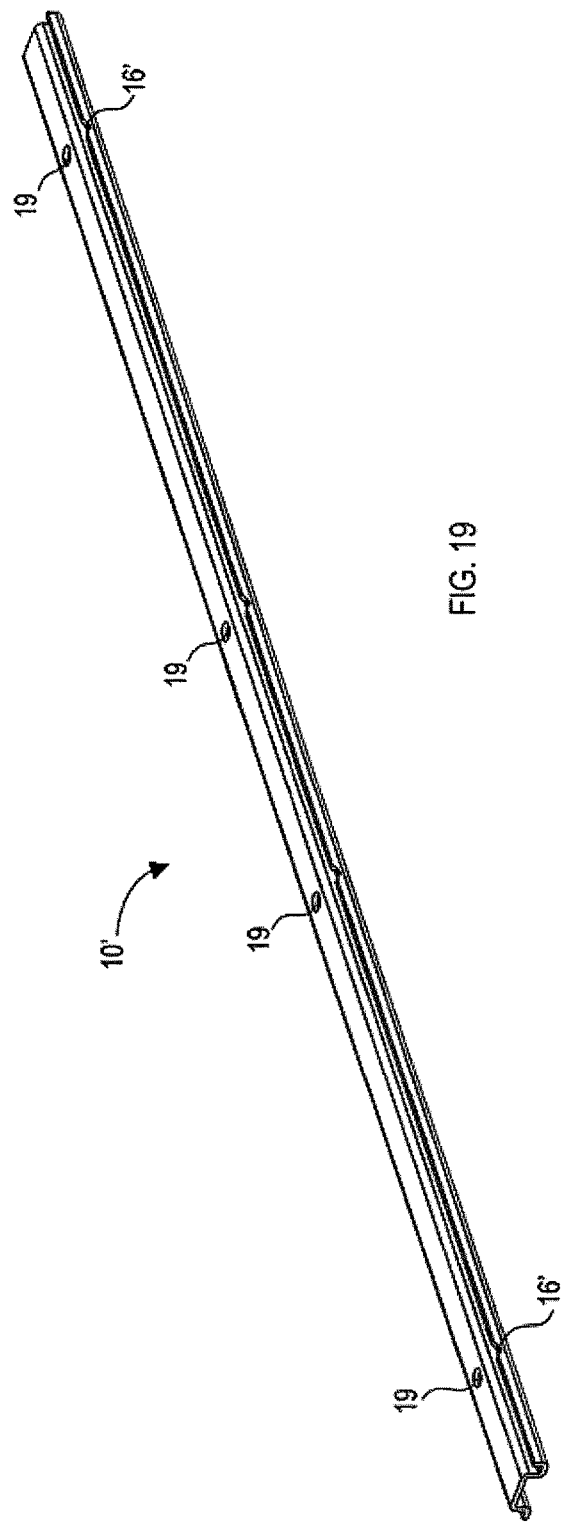
FIG. 19 is a perspective view of an embodiment of the tie bar of the present invention, as shown in FIG. 16.
Figure 20:
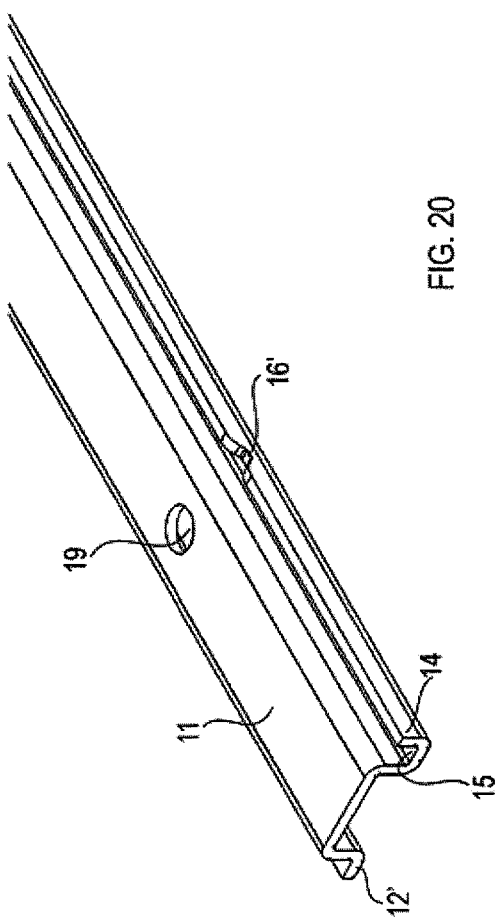
FIG. 20 is a magnified view of a portion of the tie bar of FIG. 19, showing a V-shaped notch in an outer surface of the tie bar for aligning with a center projection in an associated tie bar guide during assembly.

As shown in FIGS. 19-20, tie bar 10' further includes at least one notch 16', such as a V-shaped notch, in an outer wall for mating with a projection 26' extending from an approximate midpoint in the tie bar guide 20' during assembly (FIG. 20). As shown in FIG. 19, in an embodiment, vertical lip 14 may extend along at least a portion of the length of tie bar 10' and may comprise a plurality of spaced notches 16' each aligned with a through-hole or aperture 19 for receiving a locking pin 30. When properly positioned, each tie bar guide projection 26' mates with a corresponding notch 16' to indicate proper alignment of the tie bar guide 20', the projection/notch configuration serving as a detent to maintain the tie bar guide in the desired position.

FIGS. 21-25 depict multiple views of tie bar guide 20'. As shown, tie bar guide 20' further comprises a projection 26', such as a downward-facing hook-shaped projection, which may be positioned at the approximate midpoint in the length of the tie bar guide 20', to aid in positioning the tie bar guide with the associated tie bar 10' during assembly. As shown in FIGS. 21-22, projection 26' may be positioned below the top surface of tie bar guide 20' such that the projection extends at least partially within groove 23 when viewed in the longitudinal direction. As the tie bar 10' is slid axially within tie bar guide 20' during assembly, projection 26' slides along the upper surface of lip 14. When tie bar guide 20' is properly positioned, projection 26' may "snap" into V-shaped notch 16' in lip 14 of the tie bar 10', as shown in FIGS. 17-18.

The tie bar and tie bar guide locking assembly of the present invention solves one or more problems of casement window locking assemblies of the prior art. The present invention provides an improved casement window locking assembly which facilitates placement along the inside surface of the window frame, and requires only one tie bar guide per lock point. An improved tie bar guide is provided which includes a locating tab for aligning with an opening in the tie bar and does not wrap around the tie bar profile, allowing for simplified guide placement during installation. Moreover, the tie bar and tie bar guide are symmetrical about the length of the tie bar to allow for installation in either a left- or right-handed casement window.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of operating a casement window, the method comprising:
   providing an elongated tie bar having a planar top surface and defining a plurality of apertures, at least one of the plurality of apertures being a locating aperture for receiving a resilient locating tab of a tie bar guide, the tie bar having curved portions on opposing sides proximate the top surface, the curved portions defining first and second projections for mating with complementary receiving grooves of the tie bar guide;
   providing the tie bar guide including a first portion defining a first receiving groove and a second portion defining a second receiving groove, the first and second receiving grooves comprising the complementary receiving grooves to receive the tie bar projections in an interconnected fashion, the first and second receiving grooves proximate a base portion of the tie bar guide and extending along at least a portion of a length thereof;
   interconnecting the tie bar and tie bar guide such that the tie bar planar top surface is exposed with respect to the tie bar guide and the tie bar guide locating tab is received within the tie bar locating aperture thereby preventing movement of the tie bar in a longitudinal direction;
   fastening the tie bar guide along a surface of the casement window; and
   disengaging the tie bar guide locating projection from the tie bar locating aperture to permit the tie bar to move freely with respect to the tie bar guide in the longitudinal direction to operate the casement window between unlocked and locked positions.

2. The method of claim 1 further comprising:
   providing a locking handle mounted to an interior surface of a frame of the casement window and rotatable along an axis perpendicular to a longitudinal axis of the tie bar, the locking handle adapted to engage a locking pin received in a second one of the plurality of apertures and extending transversely through the tie bar planar top surface and slide the tie bar axially along the casement window frame;

providing the locking pin, the locking pin adapted to be tightened to a desired degree, normal to the longitudinal axis of the tie bar, against an external face of a striker mounted to a sash of the casement window when the locking handle is rotated to move the locking pin to a locked position;

providing the striker mounted to the casement window sash; and rotating the locking handle to move the locking pin between locked and unlocked positions.

3. The method of claim 2 wherein the locking pin comprises a laterally extending flange, and wherein the step of rotating the locking handle to move the locking pin between locked and unlocked positions further comprises:

holding the locking pin laterally extending flange against the external face of the striker when the locking pin is in the locked position.

4. The method of claim 2 wherein the locking pin comprises an eccentrically located projection extending from a body of the locking pin, and wherein the step of rotating the locking handle to move the locking pin between locked and unlocked positions further comprises:

rotating the locking pin about the eccentrically located projection to shift the locking pin body transversely with respect to the tie bar.

5. The method of claim 1, wherein the step of interconnecting the tie bar and tie bar guide further comprises:

inserting one of the tie bar first and second projections within a complementary one of the tie bar guide first and second receiving grooves;

applying a force to either or both of the tie bar planar top surface and the tie bar guide base portion, said force being in a direction substantially normal to a longitudinal axis of the tie bar; and causing the other of the tie bar first and second projections to be received within the other of the tie bar guide first and second receiving grooves.

6. The method of claim 1 wherein the step of interconnecting the tie bar and tie bar guide further comprises:

slidably receiving the tie bar first and second projections within the tie bar guide first and second receiving grooves.

7. The method of claim 1, wherein the tie bar guide locating tab is positioned adjacent or proximate to a fastener aperture, and wherein the step of fastening the tie bar guide along the surface of the casement window further comprises:

inserting a fastener through the fastener aperture.

8. The method of claim 1, wherein the tie bar guide further comprises a spacing extension connected to or integral with a rear surface thereof, and wherein the method further comprises:

prior to fastening the tie bar guide along the surface of the casement window, spacing the tie bar guide away from an adjacent surface of the casement window using the tie bar guide spacing extension, such that no portion of the tie bar guide extends or is received within a frame of the casement window.

* * * * *